(12) United States Patent
Miyatake et al.

(10) Patent No.: US 6,544,921 B1
(45) Date of Patent: Apr. 8, 2003

(54) SOLID CATALYST COMPONENT AND CATALYST FOR OLEFIN POLYMERIZATION, PROCESS FOR PRODUCING OLEFIN POLYMER AND PROCESS FOR PRODUCING SOLID CATALYST COMPONENT FOR OLEFIN POLYMERIZATION

(75) Inventors: Tatsuya Miyatake, Ichihara (JP); Masaaki Nabika, Ichihara (JP); Seiki Kiuchi, Ichihara (JP)

(73) Assignee: Sumitomo Chemical Comapny, Limited, Osaka (JP)

( * ) Notice: Subject to any disclaimer, the term of this patent is extended or adjusted under 35 U.S.C. 154(b) by 190 days.

(21) Appl. No.: 09/661,296

(22) Filed: Sep. 13, 2000

(30) Foreign Application Priority Data

Sep. 28, 1999 (JP) .......................................... 11-274076

(51) Int. Cl.$^7$ ............................................... B01J 31/00
(52) U.S. Cl. .......................... 502/125; 502/87; 502/151; 502/156; 502/103; 502/115; 502/127; 526/124.3; 526/124.2; 526/116; 526/348; 526/90
(58) Field of Search .......................... 502/87, 151, 156, 502/103, 115, 125, 127; 526/124.3, 124.2, 116, 348, 90

(56) References Cited

U.S. PATENT DOCUMENTS

| | | | |
|---|---|---|---|
| 4,147,664 A | | 4/1979 | Pomogailo et al. |
| 4,182,811 A | | 1/1980 | Bocharov et al. |
| 4,268,418 A | | 5/1981 | Hoff |
| 5,409,875 A | * | 4/1995 | Hsu et al. ................... 502/109 |
| 5,463,000 A | | 10/1995 | Miyoshi et al. |
| 6,281,302 B1 | * | 8/2001 | Naga et al. ............... 526/124.3 |

FOREIGN PATENT DOCUMENTS

| | | |
|---|---|---|
| DE | 19829198 | 1/1999 |
| EP | 0283011 | 9/1988 |
| EP | 0397122 | 11/1990 |
| EP | 0633272 | 1/1995 |
| EP | 0949272 | 10/1999 |
| JP | 1171421 | 3/1999 |
| WO | WO 96/30122 | * 10/1996 |

* cited by examiner

Primary Examiner—David W. Wu
Assistant Examiner—Ling-Siu Choi

(57) ABSTRACT

There are provided:

(I) a solid catalyst component (A-1) for olefin polymerization, which is obtained by a process comprising the step of contacting:
  (a-1) a carrier of carboxyl group-carrying polymer particles having an average particle diameter of from 1 to 300 μm, and
  (b) a transition metal compound of the number 4 group of metals in the periodic table of elements;

(II) a catalyst for olefin polymerization, which is obtained by a process comprising the step of contacting:
  (A-1) the above solid catalyst component, and
  (B) at least one compound selected from the group consisting of an organoaluminum compound and an organoaluminumoxy compound;

(III) a process for producing an olefin polymer, which comprises the step of polymerizing an olefin in the presence of the above catalyst; and (IV) a process for producing the above solid catalyst component (A-1), which comprises the step of contacting:
  (a-1) the above carrier, and
  (b) the above transition metal compound.

12 Claims, No Drawings

SOLID CATALYST COMPONENT AND CATALYST FOR OLEFIN POLYMERIZATION, PROCESS FOR PRODUCING OLEFIN POLYMER AND PROCESS FOR PRODUCING SOLID CATALYST COMPONENT FOR OLEFIN POLYMERIZATION

FIELD OF THE INVENTION

The present invention relates to a solid catalyst component for olefin polymerization, a catalyst for olefin polymerization, a process for producing an olefin polymer and a process for producing a solid catalyst component for olefin polymerization.

BACKGROUND OF THE INVENTION

U.S. Pat. No. 5,409,875 discloses a solid catalyst component, which is a new olefin polymerization catalyst component, and which is obtained by supporting a magnesium compound and a titanium compound on a carrier of a functional group-carrying polymer. More specifically, the patent discloses a process for producing an ethylene based polymer with use of a catalyst, which catalyst is obtained by a process comprising the following steps (i) to (v):

(i) dissolving an ethylene-unsaturated carboxylic acid copolymer in an organic solvent, (ii) adding a poor solvent to the resulting solution to precipitate the ethylene-unsaturated carboxylic acid copolymer, (iii) separating the precipitated copolymer by filtration, drying the separated copolymer, and then pulverizing the dried copolymer, (iv) contacting the pulverized copolymer, an organomagnesium compound and a transition metal compound with one another to obtain a solid catalyst component, and (v) contacting the obtained solid catalyst component with an organoaluminum compound to obtain a catalyst.

The patent also discloses that the obtained catalyst can exhibit a high activity in the polymerization of olefin, particularly in the copolymerization of ethylene with an α-olefin.

However, the above-mentioned catalyst is not sufficient from a viewpoint of obtaining an olefin polymer having a low content of lower molecular weight polymers and/or low crystallinity polymers. In addition, the above-mentioned solid catalyst component has a problem such that it contains a lot of fine powders to make its particle size distribution broad, and as a result, the obtained ethylene-α-olefin copolymer is not satisfactory in its powder properties.

SUMMARY OF THE INVENTION

Objects of the present invention are to provide (i) a solid catalyst component for olefin polymerization, (ii) a highly active catalyst for olefin polymerization, (iii) a process for producing an olefin polymer, particularly a copolymer of ethylene with an α-olefin, and (iv) a process for producing a solid catalyst component for olefin polymerization, according to which an olefin polymer having an extremely low content of lower molecular weight polymers and/or low crystallinity polymers, and an olefin polymer having superior powder properties can be obtained.

The present inventors have undertaken extensive studies to achieve the objects. As a result, it has been found that the objects can be achieved by providing (i) a solid catalyst component (A-1) for olefin polymerization, which is obtained from a combination of a carrier (a-1) of carboxyl group-carrying polymer powder having a specific average particle size and a transition metal compound (b) of the number 4 group of metals in the periodic table of elements, and (ii) a solid catalyst component (A-2) for olefin polymerization, which is obtained from a combination of a carboxyl group-carrying polymer carrier (a-2), a transition metal compound (b) of the number 4 group of metals in the periodic table of elements and a phenol compound (c). Thereby, the present invention has been obtained.

The present invention provides a solid catalyst component (A-1) for olefin polymerization, which is obtained by a process comprising the step of contacting:

(a-1) a carrier of carboxyl group-carrying polymer particles having an average particle diameter of from 1 to 300 μm, and (b) a transition metal compound of the number 4 group of metals in the periodic table of elements.

The present invention further provides a catalyst for olefin polymerization, which is obtained by a process comprising the step of contacting:

(A-1) the above-mentioned solid catalyst component, and (B) at least one compound selected from the group consisting of an organoaluminum compound and an organoaluminumoxy compound.

The present invention further provides a process for producing an olefin polymer, which comprises the step of polymerizing an olefin in the presence of the above-mentioned catalyst.

The present invention further provides a process for producing a solid catalyst component (A-1) for olefin polymerization, which comprises the step of contacting:

(a-1) a carrier of carboxyl group-carrying polymer particles having an average particle diameter of from 1 to 300 μm, and (b) a transition metal compound of the number 4 group of metals in the periodic table of elements.

The present invention further provides a solid catalyst component (A-2) for olefin polymerization, which is obtained by a process comprising the step of contacting:

(a-2) a carboxyl group-carrying polymer carrier, (b) a transition metal compound of the number 4 group of metals in the periodic table of elements, and (c) a phenol compound.

The present invention further provides a catalyst for olefin polymerization, which is obtained by a process comprising the step of contacting:

(A-2) the above-mentioned solid catalyst component, and (B) at least one compound selected from the group consisting of an organoaluminum compound and an organoaluminumoxy compound.

The present invention further provides a process for producing an olefin polymer, which comprises the step of polymerizing an olefin in the presence of the above-mentioned catalyst.

The present invention further provides a process for producing a solid catalyst component (A-2) for olefin polymerization, which comprises the step of contacting:

(a-2) a carboxyl group-carrying polymer carrier, (b) a transition metal compound of the number 4 group of metals in the periodic table of elements, and (c) a phenol compound.

DETAILED DESCRIPTION OF THE INVENTION (a) Carrier

Examples of a preferable polymer as a carrier used in the present invention are (i) a copolymer having carboxyl group-carrying unsaturated monomer units, and (ii) a carboxyl group-carrying polymer, which carboxyl groups are introduced to a polymer by a chemical or physical method. Among these polymers, the copolymer having carboxyl group-carrying unsaturated monomer units is more preferred.

As examples of the carboxyl group-carrying unsaturated monomer, unsaturated carboxylic acids such as acrylic acid and methacrylic acid are enumerated. Of these, acrylic acid is preferred.

Preferred copolymers having carboxyl group-carrying unsaturated monomer units are those having units of the carboxyl group-carrying unsaturated monomer and units of a comonomer selected from the group consisting of ethylene, propylene and styrene. Examples of such copolymers are ethylene-acrylic acid copolymer, ethylene-methacrylic acid copolymer, propylene-acrylic acid copolymer, propylene-methacrylic acid copolymer, styrene-acrylic acid copolymer and styrene-methacrylic acid copolymer. Among these copolymers, preferred are those having ethylene units, propylene units or styrene units as a main component, more preferred are those having from 49.9 to 0.1% by weight of the carboxyl group-carrying unsaturated monomer units, and from 50.1 to 99.9% by weight of ethylene units, propylene units or styrene units, and much more preferred are those having from 30 to 1% by weight of the carboxyl group-carrying unsaturated monomer units, and from 70 to 99% by weight of ethylene units, propylene units or styrene units, provided that the total weight of the copolymer is assigned to be 100% by weight. Among these copolymers, copolymers having from 20 to 5% by weight of acrylic acid units or methacrylic acid units and from 80 to 95% by weight of ethylene units are particularly preferred.

Preferred polymers used to introduce carboxyl groups by a chemical or physical method are those having ethylene, propylene or styrene units. More preferred polymers are ethylene homopolymer, propylene homopolymer, styrene homopolymer and copolymers having ethylene, propylene or styrene units as a main component. Much more preferred polymers are those having from 50.1 to 100% by weight of ethylene, propylene or styrene units and from 49.9 to 0% by weight of α-olefin units, provided that the total weight of the polymer is assigned to be 100% by weight. Specific examples of the polymer are polyethylene, ethylene-α-olefin copolymer, polypropylene, propylene-ethylene copolymer, propylene-butene-1 copolymer and polystyrene.

The chemical or physical method for introducing carboxyl groups is not limited, and may be any one known in the art. For example, there are enumerated:

(1) a process wherein a halogenated styrene units-carrying polymer such as a styrene-bromostyrene copolymer is treated with an organic alkali metal compound such as n-BuLi, and the resulting product is subjected to reaction with carbon monoxide, thereby obtaining a styrene-carboxylstyrene copolymer, and (2) a process wherein a polyolefin such as polypropylene and a carboxyl group-carrying unsaturated monomer such as acrylic acid are melt-kneaded in the presence of an organic peroxide to obtain acrylic acid-modified polypropylene.

The carboxyl group-carrying unsaturated monomer used in the process (2) may be those mentioned above. Preferred unsaturated monomers are acrylic acid and maleic anhydride. When an acid anhydride such as maleic anhydride is used, it is recommendable to subject the melt-kneaded product to hydrolysis.

Examples of the carboxyl group-carrying polymers, which carboxyl groups are introduced by a chemical or physical method, are styrene-carboxystyrene copolymer, acrylic acid-modified polyethylene, acrylic acid-modified polypropylene, acrylic acid-modified polystyrene, maleic acid-modified polyethylene, maleic acid-modified polypropylene, maleic acid-modified polystyrene, maleic anhydride-modified polyethylene, maleic anhydride-modified polypropylene, maleic anhydride-modified polystyrene, a hydrolysis product of maleic anhydride-modified polyethylene, a hydrolysis product of maleic anhydride-modified polypropylene and a hydrolysis product of maleic anhydride-modified polystyrene.

The above-mentioned carrier may be used singly or in a mixture of two or more, or may be used in combination with other polymers in a manner such that the objects of the present invention is not impaired.

An average particle diameter of the carrier is from 1 to 300 $\mu$m, preferably from 3 to 200 $\mu$m, and more preferably from 5 to 80 $\mu$m, for the production of the solid catalyst component (A-1). For the production of the solid catalyst component (A-2), the average particle diameter of the carrier is not limited, but it is preferably from 1 to 300 $\mu$m, more preferably from 3 to 200 $\mu$m, and much more preferably from 5 to 80 $\mu$m. A standard deviation of particle diameter distribution of the carrier is preferably from 0.1 to 50 $\mu$m, more preferably from 1 to 30 $\mu$m, and much more preferably from 3 to 20 $\mu$m. By using a carrier having a relatively uniform particle diameter, the content of lower molecular weight polymers and/or low crystallinity polymers in the obtained olefin polymer can be decreased, and moreover powder properties of the obtained olefin polymer can be made superior. The term, "average particle diameter" mentioned above means that measured by mixing the carrier with water or an alcohol to form a slurry, followed by measurement with a particle size measuring apparatus such as COULTER MULTISIZER. Here, the values relating to the average particle diameter and standard deviation of particle diameter distribution are by weight distribution. A shape of the carrier is preferably spherical, nearly spherical or elliptical.

As the carrier, commercially available polymer particles may be used. Alternatively. the carrier may be produced from a carboxyl group-carrying polymer. As the production method thereof, for example, there is enumerated a process wherein a carboxyl group-carrying polymer, a polar solvent which does not completely dissolve said polymer and a surface active agent are mixed with one another under stirring, which process makes use of a dispersion technique disclosed in U.S. Pat. Nos. 3,422,049 and 3,432,483. A temperature for the production thereof is preferably not lower than a melting point of the carboxyl group-carrying polymer, so far as the polymer is not subjected to thermal decomposition, and a pressure is usually from atmospheric pressure to 250 atm. As the polar solvent which does not completely dissolve the carboxyl group-carrying polymer, water and a mixed solvent mainly composed of water are particularly preferable. As the surface active agent, block copolymers of ethylene oxide and propylene oxide are exemplified. The polymer particles produced according to the process mentioned above are also commercially available.

These polymer particles mentioned above are frequently contaminated with impurities such as surface active agents and those by-produced in the course of production thereof, and therefore it is recommendable to wash them with an organic solvent to remove the impurities from a viewpoint of polymerization activity of the catalyst in accordance with the present invention. As a process for washing them to remove the impurities, for example, there is enumerated a process wherein the polymer particles (those having an average particle diameter of from 1 to 300 μm, when the solid catalyst component (A-1) is produced) are stirred in an organic solvent for 1 minute to 10 hours to form a slurry, and the particles separated from the slurry by filtration are dried under reduced pressure at 5 to 60° C. for 10 minutes to 10 hours. The thus obtained polymer particles are superior to those obtained by dissolving the carboxyl group-carrying polymer in a good solvent, followed by precipitation with use of a poor solvent, from a viewpoint such that the impurities can be removed to a higher degree and the original shape of the polymer particles before the removal of impurities can be maintained.

The organic solvent used for washing the polymer particles is a solvent which does not completely dissolve the polymer particles. Specific examples of the solvent are ketone solvents such as acetone, methyl ethyl ketone and methyl isobutyl ketone; nitrile solvents such as acetonitrile; aliphatic hydrocarbon solvents such as pentane, hexane, heptane, octane and decane; aromatic hydrocarbon solvents such as benzene, toluene and xylene; alicyclic hydrocarbon solvents such as cyclohexane and cyclopentane; halogenated hydrocarbon solvents such as 1,2-dichloroethane and monochlorobenzene; and ether solvents such as diethyl ether and tetrahydrofuran. Of these, ketone solvents are preferred, and acetone is particularly preferred from an economical point of view.

The above-mentioned washing to remove the impurities with the organic solvent can be carried out preferably under conditions such that the polymer particles do not dissolve in the organic solvent to maintain the original shape thereof, and a temperature is usually from −30 to 120° C., preferably from 0 to 100° C., and more preferably from 20 to 80° C.

(b) Transition Metal Compound

Examples of the transition metal compound of the 4 group metal of the periodic table of the elements used in the present invention are titanium compounds, zirconium compounds and hafnium compounds. Of these, titanium compounds are preferred. Among the titanium compounds preferred compounds are those represented by the following formula,

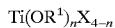

$$\mathrm{Ti}(\mathrm{OR}^1)_n\mathrm{X}_{4-n}$$

wherein Ti is a titanium atom, O is an oxygen atom, $R^1$ is an alkyl group having 1 to 4 carbon atoms, X is a chlorine atom, a bromine atom or an iodine atom, and n is 0 or an integer of 1 to 3.

Specific examples of the titanium compounds represented by the above formula are tetrahalogeno titanium compounds such as titanium tetrachloride, titanium tetrabromide and titanium tetraiodide; trihalogeno alkoxytitanium compounds such as methoxytitanium trichloride, ethoxytitanium trichloride, butoxytitanium trichloride, phenoxytitanium trichloride and ethoxytitanium tribromide; dihalogeno dialkoxytitanium compounds such as dimethoxytitanium dichloride, diethoxytitanium dichloride, dibutoxytitanium dichloride, diphenoxytitanium dichloride and diethoxytitanium dibromide; monohalogeno trialkoxytitanium compounds such as trimethoxytitanium chloride, triethoxytitanium chloride, tributoxytitanium chloride, triphenoxytitanium chloride and triethoxytitanium bromide; and tetraalkoxytitanium compounds such as tetramethoxytitanium, tetraethoxytitanium and tetraphenoxytitanium. Of these, tetrahalogeno titanium compounds are preferred, and titanium tetrachloride is particularly preferred.

(c) Phenol Compound

Unsubstituted or substituted phenol compounds can be used as the phenol compounds used in the present invention. Among the substituted phenol compounds, phenol compounds having a substituent at least at 2-position are preferred, and those having substituents at least at 2- and 6-positions are particularly preferred. Preferred substituents are a halogen atom, and alkyl, aralkyl, aryl, silyl, alkoxy, aralkoxy, aryloxy and silyloxy groups, which groups may be substituted with a halogen atom.

Specific examples of the phenol compound are 2-substituted phenols such as 2-methylphenol, 2-ethylphenol, 2-n-butylphenol, 2-isobutylphenol, 2-t-butylphenol, 2-n-propylphenol, 2-isopropylphenol, 2-phenyphenol, 2-fluorophenol, 2-chlorophenol and 2-bromophenol: 2,6-disubstituted phenols such as 2,6-dimethylphenol, 2,6-diethylphenol, 2,6-di-n-butylphenol, 2,6-diisobutylphenol, 2,6-di-t-butylphenol, 2,6-di-n-propylphenol, 2,6-diisopropylphenol, 2,6-diphenylphenol, 2,6-difluorophenol, 2,6-dichlorophenol and 2,6-dibromophenol; and 2,6,X-trisubstituted phenols (X is at least one number selected from 3, 4 and 5) such as 2,4,6-trimethylphenol, 2,6-di-t-butyl-4-methylphenol and pentafluorophenol. Among these phenol compounds, preferred are 2-methylphenol, 2-ethylphenol, 2-n-butylphenol, 2-isobutylphenol, 2-t-butylphenol, 2-n-propylphenol, 2-isopropylphenol, 2-phenylphenol, 2,6-dlmethylphenol, 2,6-diethylphenol, 2,6-di-n-butylphenol, 2,6-diisobutylphenol, 2,6-di-t-butylphenol, 2,6-di-n-propylphenol, 2,6-diisopropylphenol and 2,6-diphenylphenol. Further preferred phenol compounds are 2-substituted phenols, 2,6-disubstituted phenols and 2,6,X-trisubstituted phenols (X is as defined above), wherein the substituent is a branch-carrying alkyl, cycloalkyl or aryl group.

(A) Solid Catalyst Component for Olefin Polymerization

The solid catalyst component (A) for olefin polymerization in accordance with the present invention is:

(A-1) a solid catalyst component for olefin polymerization, which is obtained by a process comprising the step of contacting:

(a-1) a carrier of carboxyl group-carrying polymer particles having an average particle diameter of from 1 to 300 μm with (b) a transition metal compound of the number 4 group of metals in the periodic table of elements: or (A-2) a solid catalyst component for olefin polymerization, which is obtained by a process comprising the step of contacting;

(a-2) a carboxyl group-carrying polymer carrier, (b) a transition metal compound of the number 4 group of metals in the periodic table of elements and (c) a phenol compound with one another.

From a viewpoint of obtaining an olefin polymer having a lower content of lower molecular weight polymers and/or low crystallinity polymers, the solid catalyst component (A-2) is better than the solid catalyst component (A-1). Incidentally, in the production of solid catalyst component (A) for olefin polymerization in accordance with the present invention, if an organometal compound of the number 1, 2 or 13 group of metals in the periodic table of elements is used, the lower molecular weight polymers are increasingly produced, and therefore such a compound cannot be used.

In the production of solid catalyst component (A-2), contacting order of respective ingredients (a-2), (b) and (c) is not limited. It is preferred to carry out a first contact of the transition metal compound (b) with the phenol compound (c) and then a second contact of the first contact product with the carrier (a-2) in this order it is allowable to carry out the first contact and the second contact successively. However, it is recommendable to wash the first contact product with a solvent prior to carrying out the second contact, and further to wash the second contact product with a solvent. Contacting time for each contact is not particularly limited, and usually from 5 minutes to 24 hours.

Respective ingredients (a-1), (a-2), (b) and (c) used for the production of solid catalyst component (A) are used preferably in a slurry state, which is formed through dispersion in a solvent. Examples of such a solvent are aliphatic hydrocarbons such as pentane, hexane, heptane, octane and decane; aromatic hydrocarbons such as benzene, toluene and xylene; alicyclic hydrocarbons such as cyclohexane and cyclopentane; halogenated hydrocarbons such as 1,2-dichloroethane and monochlorobenzene; and ether compounds such as diethyl ether, dibutyl ether, diisoamyl other and tetrahydrofuran. Of these, aliphatic hydrocarbons and aromatic hydrocarbons are preferred, and hexane, heptane, octane, toluene and xylene are more preferred.

It is recommendable to carry out the production of solid catalyst component (A) under atmosphere of an inert gas such as nitrogen and argon at a temperature, at which the original shape of the polymer carrier can be maintained. The temperature is usually from −30 to 120° C., preferably from 0 to 100° C., and more preferably from 20 to 80° C.

With respect to a proportion of respective ingredients used for the production of solid catalyst component (A), a proportion (molar ratio) of the transition metal compound (b) to the carboxyl group in the carrier (a-1) or (a-2) is usually from 0.1 to 100 times, and preferably from 0.1 to 10 times. A proportion (molar ratio) of the phenol compound (c) to the transition metal compound (b) is usually from 0.1 to 100 times, and preforably from 0.1 to 10 times. The obtained solid catalyst component (A) is preferably placed in a cool and dark storage under atmosphere of an inert gas such as nitrogen and argon.

(B) Organoaluminum Compound and Organoaluminumoxy Compound

The "organoaluminum compound" used in the present invention means a compound having at least one Al—C bond in the molecule. Among such compounds, preferred compounds are those represented by the following formula,

wherein Al is an aluminum atom, $R^2$ is an alkyl group having 1 to 10 carbon atoms, Z is a halogen atom or a hydrogen atom, and n is a number satisfying $0 < n \leq 3$.

Specific examples of the compound represented by the above formula are trimethylaluminum, triethylaluminum, tri-n-propylaluminum, tri-n-butylaluminum, triisobutylaluminum, tri-tert-butylaluminum, triisopropylaluminum, tripentylaluminum, tri-n-hexylaluminum, tri(2-methylpentyl)aluminum, tri-n-octylaluminum, diethylaluminum hydride, diisobutylaluminum hydride, methylaluminum sesquichloride, ethylaluminum sesquichloride, isobutylaluminum sesquichloride, dimethylaluminum chloride, diethylaluminum chloride, di-n-propylaluminum chloride, di-n-butylmethylaluminum chloride, diisobutylaluminum chloride, di-tert-butylaluminum chloride, diisopropylaluminum chloride, dipentylaluminum chloride, methylaluminum dichloride, othylaluminum dichloride, isobutylaluminum dichloride, tert-butylaluminum dichloride, isopropylaluminum dichloride and pentylaluminum dichloride. Among these, diethylaluminum chloride, triethylaluminum and triisobutylaluminum are more preferable.

The organoaluminumoxy compounds used in the present invention may be aluminoxan compounds known in the art. Examples of said compounds are those obtained by the reaction between one kind of trialkylaluminum and water, and those obtained by the condensation between two or more kinds of trialkylaluminum and water. Specific examples thereof are methylaluminoxan, ethylaluminoxan, propylaluminoxan, butylaluminoxan, isobutylaluminoxan, methylethylaluminoxan, methylbutylaluminoxan and methylisobutylaluminoxan. Of these, methylaluminoxan, isobutylaluminoxan and methylisobutylaluminoxan are particularly preferred.

Production of Olefin Polymer

In producing the olefin polymer, there is no limitation relating to a method for feeding the solid catalyst component (A) and at least one compound (B) selected from the group consisting of the organoaluminum compounds and the organoaluminumoxy compounds to a polymerization vessel. For example, the feeding of these ingredients can be carried out in a water-free state under atmosphere of an inert gas such as nitrogen and argon in the presence of an olefin monomer to be polymerized. The ingredients, namely the solid catalyst component (A) and the compound (B) may be fed independently of each other to a polymerization vessel, or a contact product between both ingredients may be fed thereto.

An amount of the compound (B) in terms of the aluminum atom contained therein is usually from 1 to 10000 moles, and preferably from 1 to 3000 moles per mole of the transition metal atom in the solid catalyst component (A).

In producing the olefin polymer, an additional compound such as a known electron donor and hydrogen may be fed at the same time. Preferred electron donor is, for example, an organic compound having an Si-OR$^3$ bond, wherein R$^3$ is a hydrocarbon group having 1 to 20 carbon atoms. Specific examples of the Si-OR$^3$ bond-having organic compound are tetramethoxysilane, dimethyldimethoxysilane, tetraethoxysilane, triethoxysilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethyoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

In the present invention, besides a contact of the solid catalyst component (A) with at least one compound (B) selected from the group consisting of the organoaluminum compounds and the organoaluminumoxy compounds, a solid catalyst component (A'), which is obtained by subjecting the solid catalyst component (A) to pre-polymerization treatment, may be brought into contact with the compound (B) Here, the "pre-polymerization treatment" means a treatment to polymerize a small amount of an olefin on the surface of the solid catalyst component (A). As an example of a process of the pre-polymerization treatment, there is enumerated a process wherein the compound (B) and an olefin are brought into contact with the solid catalyst component (A). Such an olefin is not limited, and examples thereof are ethylene, propylene and butene-1. The olefin may be used singly or in combination of two or more.

The solid catalyst component (A) used for the prepolymerization is used preferably in a slurry state formed through dispersion into a solvent. Examples of the solvent are aliphatic hydrocarbons such as butane, pentane, hexane and heptane, and aromatic hydrocarbons such as toluene and xylene.

A molar ratio of Al in the compound (B) used for the pre-polymerization to Ti in the solid catalyst component (A), (Al/Ti), is usually from 0.1 to 100, and particularly preferably from 1 to 10. A pre-polymerization temperature is usually from −30 to 80° C., and particularly preferably from −10 to 50° C. A polymerization amount of the olefin in the pre-polymerization is usually from 0.1 to 100 g, and particularly preferably from 0.5 to 50 g per g of the solid catalyst component (A).

As examples of the olefin polymerized according to the present invention, olefins having 2 to 20 carbon atoms and diolefins are enumerated. The olefin may be used singly or in combination of two or more. Specific examples of the olefin are ethylene, propylene, butene-1, pentene-1, hexene-1, heptene-1, octene-1, nonene-1, decene-1, 5-methyl-2-pentene-1 and vinylcyclohexene. Examples of the combination of two or more olefins are ethylene-propylene, ethylene-butene-1, ethylene-hexene-1, ethylene-octene-1 and propylene-butene-1.

Preferred examples of the olefin polymer produced by the present invention are ethylene-α-olefin copolymers, and more specifically, ethylene-propylene copolymer, ethylene-butene-1 copolymer, ethylene-hexene-1 copolymer and ethylene-octene-1 copolymer.

In the process for producing the olefin polymer in accordance with the present invention, a chain transfer agent such as hydrogen can be fed to a polymerization vessel to regulate a molecular weight of the olefin polymer to be produced.

A polymerization temperature is usually from −30 to 300° C., preferably from 20 to 250° C., and more preferably from 20 to 100° C., provided that the temperature is not higher than a melting point of the polymer to be obtained. A polymerization pressure is not limited, and a pressure of from atmospheric pressure to about 150 atm. is preferred from industrial and economical points of view. A polymerization time can be appropriately determined depending on the kind of polymer to be obtained and a reaction apparatus, and usually from 5 minutes to 40 hours.

The polymerization may be carried out in a continuous manner or batchwise, and a slurry or solvent polymerization with use of an inert hydrocarbon solvent such as propane, pentane, hexane, heptane and octane, and a liquid or gas phase polymerization with use of no solvent can be applied. Of these, the slurry polymerization and the gas phase polymerization are particularly suitable.

According to the present invention concerned with the solid catalyst component (A-1), there are provided (i) a solid catalyst component for olefin polymerization, (ii) a highly active catalyst for olefin polymerization, (iii) a process for producing an olefin polymer, particularly a copolymer of ethylene with an α-olefin, and (iv) a process for producing a solid catalyst component for olefin polymerization, according to which an olefin polymer having an extremely low content of lower molecular weight polymers and/or low crstallinity polymers, and having superior powder properties can be obtained.

Further, according to the present invention concerned with the solid catalyst component (A-2), there are provided (i) a solid catalyst component for olefin polymerization, (ii) a highly active catalyst for olefin polymerization, (iii) a process for producing an olefin polymer, particularly a copolymer of ethylene with an α-olefin, and (iv) a process for producing a solid catalyst component for olefin polymerization, according to which an olefin polymer having an extremely low content of lower molecular weight polymers and/or low crstallinity polymers can be obtained.

EXAMPLE

The present invention is explained in more detail with reference to the following Examples, which are only illustrative and not to be construed to limit the scope of the present invention. The measurement values relating to particulars in Examples were obtained in the following manner.
1. Ti Content in Catalyst
   Measured according to ICP emission analysis using Optima 3000 manufactured by Perkin Elmer Ltd.
2. Content of α-olefin Unit in Olefin Polymer
   Measured from the absorption characteristics of ethylene and the α-olefin using an infrared spectrophotometer, IR-810, manufactured by Japan Spectroscopic Co., Ltd., and expressed in terms of a short chain branching number (SCB) per 1000 C (carbon atom). The SCB value is increased with increase of the α-olefin content.
3. Melt Flow Rate (MFR)
   Measured at 190° C. according to ASTM D1238.
4. Melt Flow Rate Ratio (MFRR)
   MFRR was calculated according to the following equation using the melt flow rate (MFR, load: 2.160 kg) measured at 190° C. according to ASTM D1238 and that (MFR) measured in the same manner, except that the load was changed to 21.60 kg:

$MFRR=MFR(21.60 \text{ kg})/MFR(2.160 \text{ kg})$.

5. Lower Molecular Weight Polymers and/or Low Crystallinity Polymers
   Evaluated by a weight of a 20° C. cold xylene-soluble portions (CXS, by weight) in the olefin polymer. In general, the CXS value tends to increase with increase of the SCB value. cl Example 1
(1) Washing of Polymer Particles
   In a 200 ml round bottom flask equipped with a stirrer, which flask had been purged with nitrogen gas, 10 g of polymer particles having an average particle diameter of 30 μm and a standard deviation of particle diameter distribution of 15.1 μm, and 100 ml of acetone were fed, stirred for 10 minutes at room temperature, and thereafter filtered to separate polymer particles. The polymer particles used was FLOW BEADS (trade mark), manufactured by Sumitomo Seika Chemicals, Co., i.e. particles of an ethylene-acrylic acid copolymer having an acrylic acid unit content of 7.0% by weight.

The total of the polymer particles separated and 100 ml of acetone were placed in the above-mentioned flask and treated in the same manner as above. The polymer particles separated were dried at 40° C. for 3 hours under reduced pressure, thereby recovering the polymer particles in an amount nearly equal to the feeding one. It was found that the polymer particles maintained their original shape.
(2) Production of Solid Catalyst Component
   In a 100 ml round bottom flask equipped with a stirrer, which flask had been thoroughly purged with nitrogen gas, 2.0 g of the polymer particles obtained in the above (1) and 60 ml of n-heptane were fed. To the resulting mixture was dropwise added 1.1 ml of titanium tetrachloride under stirring at room temperature. Thereafter, the mixture was stirred at 40° C. for 1 hour. The reaction mixture obtained was filtered, and a solid separated was washed three times with each 20 ml of hexane. The solid washed was dried at room temperature for 2 hours under reduced pressure, thereby obtaining a solid catalyst component (A-1). It was found that the solid catalyst component (A-1) had a Ti content of 14.3 μmol/g.

(3) Copolymerization of Ethylene with Butene-1

A 400 ml stainless steel-made pressure reaction tube equipped with a stirrer, which tube had been thoroughly purged with nitrogen gas, was held in reduced pressure, and 20 g of butene-1 and 80 g of n-butane were fed therein. Thereafter, the temperature in the system was raised to 70° C., and hydrogen and ethylene were fed therein to obtain hydrogen and ethylene pressures of 6.0 kg/cm² and 10 kg/cm², respectively. Thereafter, the mixture was stirred for a while until the system reached saturation. Here, the "saturation" means a state at which the gauge pressure of ethylene no longer decreases from the pressure of 10 kg/cm². To the mixture, 2 ml of a heptane solution of trioctylaluminum (concentration: 0.1 mmol/ml) and a liquid prepared by suspending 21.8 mg of the solid catalyst component (A-1) in 5 ml of n-heptane were fed in this order under pressure of argon gas to initiate polymerization. One hour after the initiation of polymerization, ethanol was fed in the system to discontinue the polymerization, and unreacted gases were purged to recover a copolymer.

The copolymer was dried at 60° C. for 4 hours under reduced pressure, thereby obtaining 7.6 g of ethylenebutene-1 copolymer. With respect to the copolymer obtained, SCB, MFR, MFRR and CXS were found to be 18.4 (/1000 C), 0.45 (g/10 min.), 39.6 and 4.3% by weight, respectively. cl Example 2

(1) Washing of Polymer Particles

Example 1 (1) was repeated, except that the polymer particles having a standard deviation of particle diameter distribution of 15.1 μm was replaced by polymer particles having a standard deviation of particle diameter distribution of 8.3 μm. As a result, the polymer particles were recovered in an amount nearly equal to the feeding one, and it was found that the polymer particles maintained their original shape.

(2) Production of Solid Catalyst Component

In a 500 ml round bottom flask equipped with a stirrer, which flask had been thoroughly purged with nitrogen gas, 200 ml of heptane and 48.1 ml of 2-tert-butylphenol were fed, and heated to 40° C. under stirring. To the mixture was dropwise added a solution composed of 17.6 ml of titanium tetrachloride and 80 ml of heptane over 70 minutes. Thereafter, the mixture was further heated to 60° C., and then allowed to react with one another for 2 hours. After the reaction was over, the solvent was evaporated at 120° C. to obtain a dried reaction product. The dried product was washed two times with each 200 ml of hexane, and the product washed was dried at 120° C. for 30 minutes, and thereafter cooled to room temperature, thereby obtaining a solid component.

In a 300 ml round bottom flask equipped with a stirrer, which flask had been thoroughly purged with nitrogen gas, 37.5 g (90 mmol in terms of titanium atom) of the solid component obtained above and 180 ml of heptane were fed to form a slurry of the solid component. To the resultant were added 18 g of the polymer particles obtained in the above (1) and 10 ml of n-heptane, and the resulting mixture was allowed to react with one another at 40° C. for 1 hour under stirring. The reaction mixture obtained was filtered, and a solid separated was washed three times with each 20 ml of hexane. The solid washed was dried at room temperature for 2 hours under reduced pressure, thereby obtaining a solid catalyst component (A-2). It was found that the solid catalyst component (A-2) had a Ti content of 22.9 μmol/g (3) Copolymerization of Ethylene with Butene-1

Example 1 (3) was repeated, except that the solid catalyst component (A-1) was replaced by the solid catalyst component (A-2), thereby obtaining 14.4 g of a dried ethylene-butene-1 copolymer. With respect to the copolymer obtained, SCB, MFR and MFRR were found to be 15.6 (/1000 C), 0.54 (g/10 min.) and 24.7, respectively, and CXS was not more than the limit of detection.

What is claimed is:

1. A process for producing a solid catalyst component (A-1) for olefin polymerization, which comprises the step of contacting:

(a-1) a carrier of carboxyl group-carrying polymer particles having an average particle diameter of from 1 to 300 μm, and (b) a transition metal compound of the number 4 group of metals in the periodic table of elements, wherein said process does not use an organometal compound of a metal of groups 1, 2 or 13.

2. The process for producing a solid catalyst component (A-1) for olefin polymerization according to claim 1, wherein the carrier comprises a carrier obtained by a process comprising the step of washing carboxyl group-carrying polymer particles having an average particle diameter of from 1 to 300 μm with an organic solvent.

3. The process for producing a solid catalyst component (A-1) for olefin polymerization according to claim 1, wherein the carrier comprises a carrier obtained by a process comprising the steps of:

(i) mixing carboxyl group-carrying polymer particles having an average particle diameter of from 1 to 300 μm with an organic solvent to form a slurry, (ii) separating the polymer particles from the slurry by filtration, and (iii) drying the polymer particles separated.

4. The process for producing a solid catalyst component (A-1) for olefin polymerization according to claim 1, wherein the polymer particles comprises those having a standard deviation of particle diameter distribution of from 0.1 to 50 μm.

5. The process for producing a solid catalyst component (A-1) for olefin polymerization according to claim 1, wherein the carboxyl group-carrying polymer comprises a copolymer having carboxyl group-carrying unsaturated monomer units, or a carboxyl group-carrying polymer, which carboxyl groups are introduced to a polymer by a chemical or physical method.

6. The process for producing a solid catalyst component (A-1) for olefin polymerization according to claim 1, wherein the carboxyl group-carrying polymer comprises a copolymer having ethylene units and acrylic acid units.

7. The process for producing a solid catalyst component (A-1) for olefin polymerization according to claim 1, wherein the transition metal compound of the number 4 group of metals in the periodic table of elements comprises a titanium compound represented by the following formula,

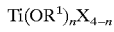

wherein Ti is a titanium atom, O is an oxygen atom, $R^1$ is an alkyl group having 1 to 4 carbon atoms, X is a chlorine atom, a bromine atom or an iodine atom, and n is 0 or an integer of 1 to 3.

8. A process for producing a solid catalyst component (A-2) for olefin polymerization, which comprises the step of contacting:

(a-2) a carboxyl group-carrying polymer carrier, (b) a transition metal compound of the number 4 group of metals in the periodic table of elements, and (c) a phenol compound, wherein said process does not use an organometal compound of a metal of groups 1, 2 or 13.

9. The process for producing a solid catalyst component (A-2) for olefin polymerization according to claim 8, wherein the phenol compound comprises a phenol compound having a substituent at least at 2-position.

10. The process for producing a solid catalyst component (A-2) for olefin polymerization according to claim 8, wherein the carboxyl group-carrying polymer comprises a copolymer having carboxyl group-carrying unsaturated monomer units, or a carboxyl group-carrying polymer, which carboxyl groups are introduced to a polymer by a chemical or physical method.

11. The process for producing a solid catalyst component (A-2) for olefin polymerization according to claim 8, wherein the carboxyl group-carrying polymer comprises ethylene units and acrylic acid units.

12. The process for producing a solid catalyst component (A-2) for olefin polymerization according to claim 8, wherein the transition metal compound of the number 4 group of metals in the periodic table of elements comprises a titanium compound represented by the following formula, $$\text{Ti}(\text{OR}^1)_n\text{X}_{4-n}$$

wherein Ti is a titanium atom, O is an oxygen atom, $R^1$ is an alkyl group having 1 to 4 carbon atoms, X is a chlorine atom, a bromine atom or an iodine atom, and n is 0 or an integer of 1 to 3.

* * * * *